(12) United States Patent
Atsuta

(10) Patent No.: US 9,000,691 B2
(45) Date of Patent: Apr. 7, 2015

(54) METHOD OF CONTROLLING VIBRATION MOTOR

(75) Inventor: Akio Atsuta, Yokosuka (JP)

(73) Assignee: Canon Kabushiki Kaisha, Tokyo (JP)

(*) Notice: Subject to any disclaimer, the term of this patent is extended or adjusted under 35 U.S.C. 154(b) by 980 days.

(21) Appl. No.: 13/107,121

(22) Filed: May 13, 2011

(65) Prior Publication Data

US 2011/0291595 A1    Dec. 1, 2011

(30) Foreign Application Priority Data

May 31, 2010  (JP) ................................. 2010-124793
Apr. 15, 2011  (JP) ................................. 2011-091077

(51) Int. Cl.
H02K 33/00      (2006.01)
H02P 25/02      (2006.01)

(52) U.S. Cl.
CPC ................................. *H02P 25/027* (2013.01)

(58) Field of Classification Search
USPC ........................................................ 318/119
See application file for complete search history.

(56) References Cited

U.S. PATENT DOCUMENTS

| | | | |
|---|---|---|---|
| 5,099,180 A | 3/1992 | Noguchi | |
| 5,612,598 A | 3/1997 | Fukui et al. | |
| 5,656,881 A | 8/1997 | Atsuta | |
| 5,739,621 A | 4/1998 | Atsuta et al. | |
| 5,920,144 A * | 7/1999 | Atsuta | 310/316.02 |
| 5,986,385 A | 11/1999 | Atsuta | |
| 6,037,701 A | 3/2000 | Atsuta | |
| 6,072,267 A | 6/2000 | Atsuta | |
| 6,100,622 A | 8/2000 | Yamamoto et al. | |
| 6,107,720 A | 8/2000 | Atsuta | |
| 6,121,714 A * | 9/2000 | Atsuta | 310/316.01 |
| 6,133,671 A | 10/2000 | Atsuta et al. | |
| 6,177,753 B1 | 1/2001 | Atsuta | |
| 6,376,965 B1 | 4/2002 | Kataoka et al. | |
| 6,538,402 B2 | 3/2003 | Gokturk et al. | |

(Continued)

FOREIGN PATENT DOCUMENTS

CN    100539390 C    9/2009
EP    1117176 A2    7/2001

(Continued)

OTHER PUBLICATIONS

Notification of the First Office Action dated Jul. 3, 2013, in Chinese Application No. 201110144052.2.

(Continued)

*Primary Examiner* — Kawing Chan
(74) *Attorney, Agent, or Firm* — Fitzpatrick, Cella, Harper & Scinto

(57) ABSTRACT

Provided is a method of controlling a vibration motor, in which there are provided: a unit that generates a drive signal for generating elliptic motion; a unit that switches the drive signal with a voltage from a power supply, and changes a pulse width of the drive signal; a unit that detects a current flowing in an electromechanical energy conversion element through the switching unit; a unit that detects a position and a velocity of an object to be driven; and a control unit that controls the respective units, and sets the velocity of the object to be driven. The control unit controls a frequency and the pulse width of the drive signal so as to exercise a maximum output characteristic with respect to a target velocity within a range in which the current detected by the current detection unit does not exceed a given limit value.

20 Claims, 13 Drawing Sheets

(56) References Cited

U.S. PATENT DOCUMENTS

| | | |
|---|---|---|
| 6,608,426 B2 | 8/2003 | Hayashi et al. |
| 6,635,977 B2 | 10/2003 | Kataoka et al. |
| 7,148,636 B2 | 12/2006 | Ueda et al. |
| 7,701,116 B2 | 4/2010 | Atsuta |
| 2003/0117223 A1 | 6/2003 | Shimoda et al. |
| 2010/0134060 A1* | 6/2010 | Vermeir .................. 318/400.32 |
| 2010/0213882 A1* | 8/2010 | Adachi et al. ................ 318/116 |

FOREIGN PATENT DOCUMENTS

| | | |
|---|---|---|
| JP | 63-268474 A | 11/1988 |
| JP | 03-22871 A | 1/1991 |
| JP | 6-237581 A | 8/1994 |
| JP | 07-308085 A | 11/1995 |
| JP | 9-271174 A | 10/1997 |
| JP | 2000-184759 A | 6/2000 |
| JP | 3140236 B2 | 3/2001 |
| JP | 2003-93969 A | 4/2003 |

OTHER PUBLICATIONS

Office Action in Japanese Patent Application No. 2011-091077, dated Feb. 3, 2015.

* cited by examiner

METHOD OF CONTROLLING VIBRATION MOTOR

BACKGROUND OF THE INVENTION

1. Field of the Invention

The present invention relates to a method of controlling a vibration motor which generates vibrational waves in an ultrasonic vibrator, and relatively moves a movable body contacting the ultrasonic vibrator by a frictional force.

2. Description of the Related Art

Devices such as cameras or digital camcorders use a vibration motor in which an AC signal is supplied to an electromechanical energy conversion element, and vibrational waves are generated in an ultrasonic vibrator to relatively move a movable body contacting the ultrasonic vibrator by a frictional force. In such a device, an electric power supply source is a battery.

In recent years, the devices such as cameras or digital camcorders are increasingly downsized, and the batteries are also downsized with reduction in a power supply capacity. Various power saving measures are therefore proposed.

For example, Japanese Patent No. 3,140,236 proposes, as illustrated in FIG. 8, an ultrasonic motor driver circuit in which in order to prevent noise from occurring, a pulse width of a drive pulse is changed according to a battery voltage, and if the battery voltage is sufficiently high, the pulse width is narrowed to prevent the supply of unnecessary energy.

Further, a vibration motor driver circuit is known which conducts control so that a motor driving method is changed according to the battery voltage to keep a constant input power.

Further, Japanese Patent Application Laid-Open No. H09-271174 proposes a control device for a vibrational wave actuator, which detects a drive current and controls a pulse width so that the detected value does not exceed an allowable current.

However, the above-mentioned related art suffers from the following problems.

In Japanese Patent No. 3,140,236, the pulse width and the driving method can be changed according to the battery voltage. However, because a detection target is the battery voltage, a current actually consumed by the motor cannot be detected.

For that reason, it is impossible to deal with a case where the current is increased by a change in temperature or a change in drive load. If the current exceeds a given amount that can be supplied by the battery, there arises such a problem that the current more than the given amount cannot be supplied, and the battery voltage decreases with the result that an overall system of the device stops.

Further, in the case where the method as disclosed in Japanese Patent Application Laid-Open No. H09-271174 is used, which detects a current value and controls the pulse width so that the current does not exceed a given value, the following problem arises.

In a "first frequency domain" where a motor output also increases with an increase in input electric power due to a frequency change, a pulse width control and a velocity control are implemented at the same time.

For that reason, the operation of decreasing a frequency for increasing the velocity and the operation of decreasing the pulse width for decreasing the current are mixed, and stable driving cannot be conducted.

Further, there arises such a problem that the frequency exceeds a resonance frequency, thereby causing the motor to stop.

Further, the voltage is increased due to an amplification effect associated with an impedance circuit in a driver circuit which is away from the resonance frequency.

However, in a frequency domain where a current flows into a capacity component side of the vibration motor, that is, a "second frequency domain" where the motor output does not increase with an increase in the input electric power due to the frequency change, the operation is conducted so that the current in an amount that can be always output (that is, to the utmost limit) flows.

For that reason, an ineffective current flowing in the capacity component side always continues to flow, thereby degrading the circuit efficiency.

SUMMARY OF THE INVENTION

The present invention has been made in view of the above-mentioned problems, and has an object to provide a method of controlling a vibration motor, which is capable of controlling a frequency and a pulse width so that a current does not exceed the current supply amount in a case where the current is increased due to a change in temperature and a change in drive load, and so that a large power is output within the limited supply amount.

According to the present invention, there is provided a method of controlling a vibration motor, the vibration motor comprising at least; an electromechanical energy conversion element, an elastic body having a contact portion joined with the electromechanical energy conversion element, and a vibrator which is configured so as to generate elliptic motion on the contact portion of the elastic body by application of a drive voltage from a power supply for the electromechanical energy conversion element, the vibration motor being configured so as to relatively move an object to be driven, which contacts the contact portion of the elastic body, with respect to the vibrator by the elliptic motion, in which there are provided; a drive signal generation unit that generates a drive signal for generating the elliptic motion, a switching unit that switches the drive signal with a voltage from the power supply, and changes a pulse width of the drive signal, a current detection unit that detects a current flowing in the electromechanical energy conversion element through the switching unit, a detection unit that detects a position and a velocity of the object to be driven, and a control unit that controls the drive signal generation unit, the switching unit, the current detection unit, and the detection unit, and sets the velocity of the object to be driven, and in which the control unit controls a frequency and the pulse width of the drive signal so as to exercise a maximum output characteristic with respect to a target velocity of the object to be driven, within a range in which the current detected by the current detection unit does not exceed a given limit value, the target velocity being set by the control unit.

The present invention can realize the method of controlling a vibration motor, which is capable of controlling the frequency and the pulse width so that a current does not exceed the current supply amount in the case where the current is increased due to a change in temperature and a change in drive load, and so that a large power is output within the limited supply amount.

In particular, the method is effective for the case of using a power supply with a limited current supply amount.

Further features of the present invention will become apparent from the following description of exemplary embodiments with reference to the attached drawings.

DESCRIPTION OF THE EMBODIMENTS

By way of examples, modes for embodying the present invention are described below.

Example 1

Figure 1:
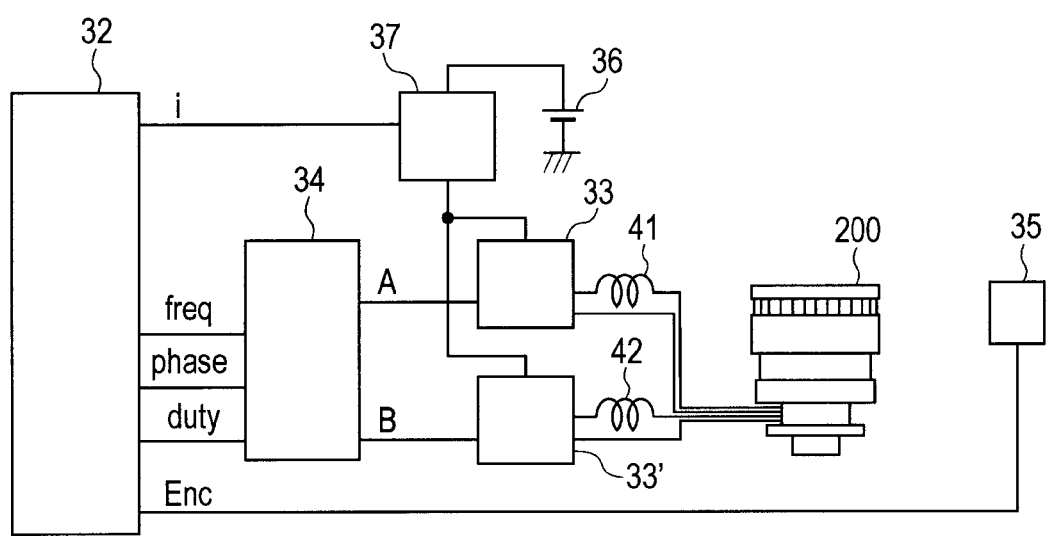
FIG. 1 is a block diagram illustrating a configuration of a vibration motor control circuit used in a vibration motor control method according to Example 1 of the present invention.

Referring to a block diagram of FIG. 1, a configuration of a method of controlling a vibration motor according to Example 1 of the present invention is described.

The vibration motor according to this example includes an electromechanical energy conversion element, an elastic body having a contact portion joined with the electromechanical energy conversion element, and a vibrator which is configured so as to generate elliptic motion on the contact portion of the elastic body, by application of a drive voltage from a power supply having a limited supply amount to the electromechanical energy conversion element.

An object to be driven that contacts the contact portion of the elastic body is relatively moved with respect to the vibrator by the elliptic motion.

FIG. 1 illustrates a vibration motor 200 and a control unit 32 configured by a microcomputer for conducting control. In the following description, the control unit 32 is simply referred to as "microcomputer".

An oscillator (drive signal generation unit) 34 generates a drive signal of a first mode (mode A) or a second mode (mode B) according to a command value from the microcomputer, in order to generate the above-mentioned elliptic motion.

An amplifier circuit (switching unit) 33 switches the signal of the mode A with a supply voltage, and produces a larger drive force in combination with an impedance element 41.

An amplifier circuit (switching unit) 33' switches the signal of the mode B with the supply voltage, and produces a larger drive force in combination with an impedance element 42.

A power supply 36 such as a battery applies a voltage to the amplifier circuits 33 and 33'. A current detector circuit (current detection unit) 37 detects a supply current from the power supply 36.

A current value detected by the current detector circuit 37 is input to the microcomputer, and used as information on a current limit algorithm according to this example.

A position detection unit 35 detects a position and a velocity of a movable body (object to be driven). Based on a result obtained by the position detection unit 35, the position and velocity information on the movable body is transferred to the microcomputer 32, and the microcomputer 32 controls the motor according to the transferred position and velocity information.

An example of the configuration of the vibration motor is described with reference to FIGS. 2 and 3.

Figure 2:
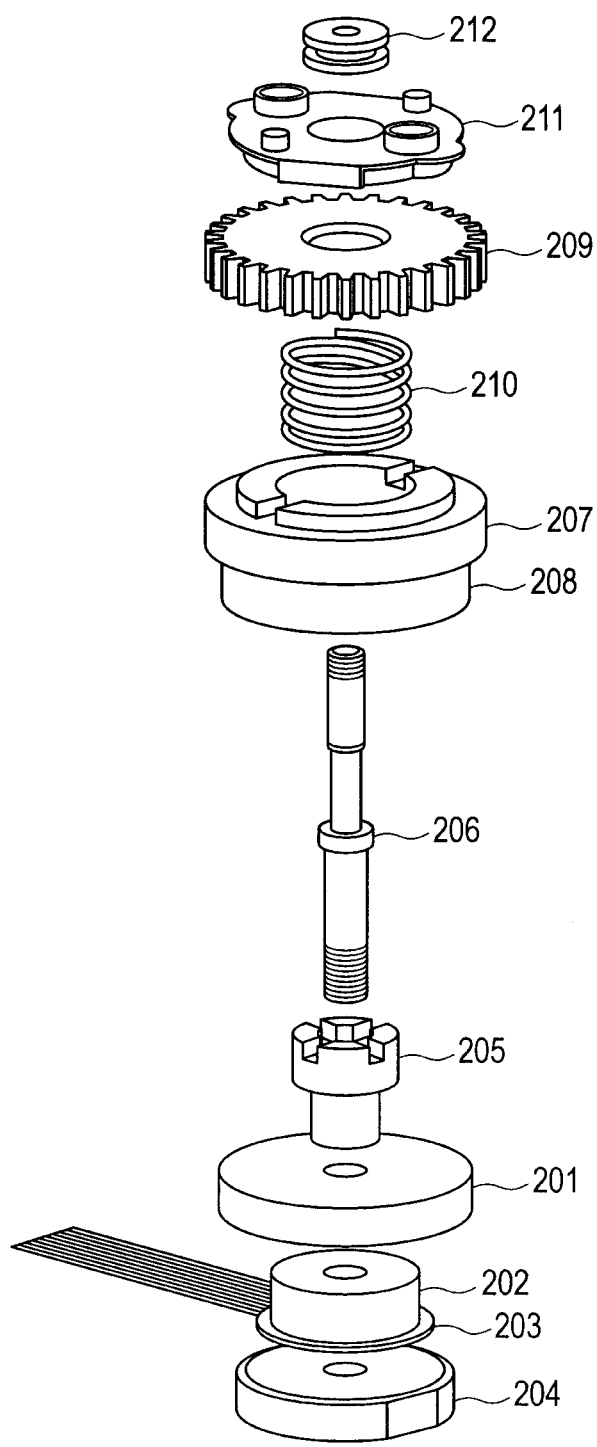
FIG. 2 is an exploded perspective view of a vibration motor according to Example 1 of the present invention.
Figure 3:
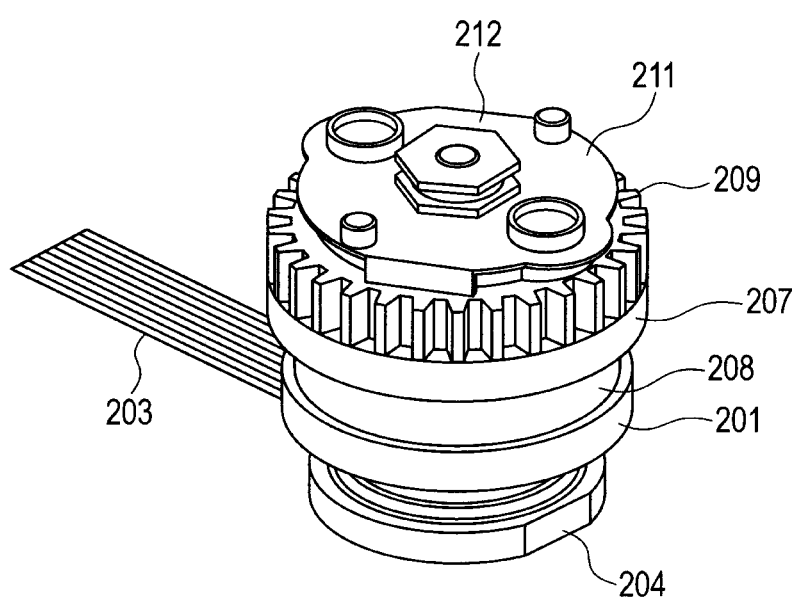
FIG. 3 is a perspective view of the vibration motor illustrated in FIG. 2 after assembling according to Example 1 of the present invention.

Referring to FIGS. 2 and 3, a first plate-shaped (disc-shaped) elastic body 201 is made of a material with a low vibration attenuation loss, such as metal, and a piezoelectric element 202 is an electromechanical energy conversion element.

Further, a flexible substrate 203 supplies an AC signal to the piezoelectric element 202 from a power supply (not shown). A lower nut 204 is engaged with a screw which is formed in a lower end of a shaft 206, and a second elastic body 205 is disposed.

The shaft 206 is inserted into through-holes formed in the center of the first elastic body 201, the piezoelectric element 202, the flexible substrate 203, and the second elastic body 205.

A step is disposed in the middle of the shaft 206, and the step abuts against a step formed on an inner wall of the second elastic body 205.

One end (lower end) of the shaft 206 is threaded, and the threaded portion is engaged with the lower nut 204, which is a fastening member, and tightened thereto. In this manner, the second elastic body 205, the first elastic body 201, the piezoelectric element 202, and the flexible substrate 203 can be fixed to each other.

A contact spring 208, which is fixed to a rotor 207 as a movable body, comes in pressure contact with a surface of the first elastic body 201, which is not in contact with the piezoelectric element 202.

The contact spring 208 has elasticity. The contact spring 208 is fixed to the rotor 207 and rotates integrally.

A gear 209, which is an output unit, allows the rotor 207 to travel in a rotating axial direction, and is engaged with the rotor 207 so as to follow the travel of the rotor 207 with rotating motion.

A pressing unit 210 such as a spring is disposed between a spring receiving portion of the rotor 207 and the gear 209, and presses the rotor 207 down toward the first elastic body 201.

The gear 209 is pivotally supported by a fixing member 211 coupled to the shaft 206, and an axial position of the gear 209 is regulated by the fixing member 211.

The other end (upper end) of the shaft 206, which is not engaged with the lower nut 204, is also threaded, and the threaded portion is engaged with an upper nut 212 so that the shaft 206 is fixed to the fixing member 211.

A screw hole is formed in the fixing member 211, and the vibration motor can be fitted to a desired portion by fixing the fixing member 211 to the desired portion by a screw.

The piezoelectric element 202 is configured such that, for example, an electrode film is formed on each surface of one piezoelectric body, the electrode film on one surface thereof is divided into two electrode films, and two regions in which the electrode films are formed are polarized to be in opposite directions along a thickness direction of the piezoelectric element 202.

When the same AC signal is supplied to those two electrode films, one region of the piezoelectric element 202 is expanded in the thickness direction whereas the other region is contracted in the thickness direction.

Another piezoelectric body is overlapped on the piezoelectric body so that the phases of the electrode films are shifted from each other by 90 degrees, and AC signals which are temporally shifted in phase by 90 degrees are supplied to those two piezoelectric bodies.

Then, two bending vibrations (an amplitude direction of one bending vibration is perpendicular to the axial direction of the shaft 206, and an amplitude direction of the other bending vibration is also perpendicular to the axial direction of the shaft 206) occur in the oscillator so as to swing the first elastic body 201 from side to side.

With combination of those vibrations, elliptic motion is excited on the surface of the first elastic body 201.

When the contact spring 208 is brought into pressure contact with the surface of the first elastic body 201 where the elliptic motion is excited, the contact spring 208 and the rotor 207 travel so as to be pushed by the elliptic motion.

The configuration of the vibration motor is not limited to the above-mentioned configuration, but the motor may be configured as follows.

For example, the motor is configured by the electromechanical energy conversion element such as a piezoelectric element, the vibrator, and the movable body, and an AC voltage of two or more phases is applied to the electromechanical energy conversion element to generate a progressive vibrational wave in the vibrator.

The motor may be so configured as to transmit the vibration energy to the movable body such as a rotor which is brought into pressure contact with the vibrator.

Next, a circuit configuration of the driver (amplifier circuits 33 and 33') in this example is described with reference to FIG. 4A.

Figure 4A:
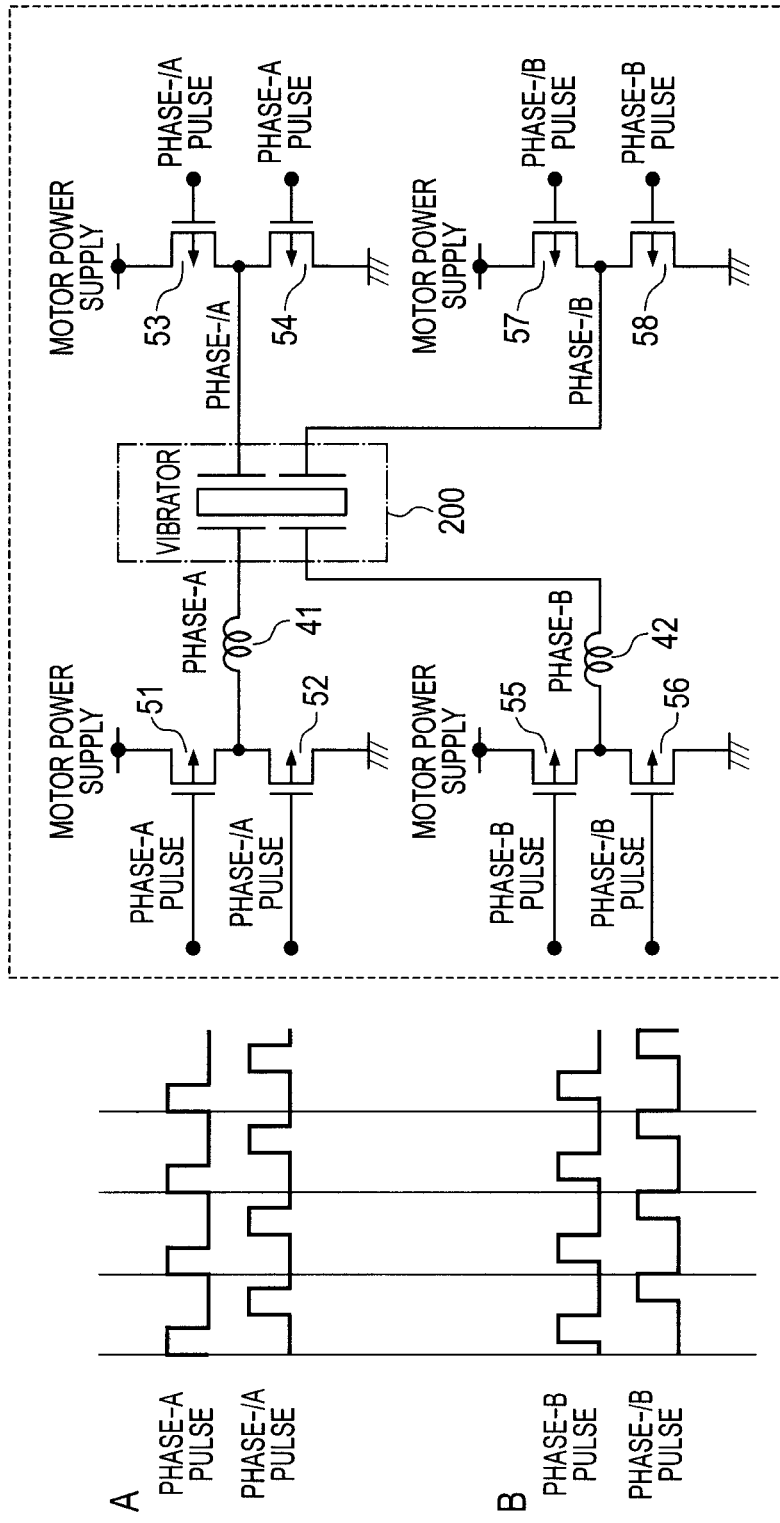
FIG. 4A is a diagram illustrating a circuit configuration of a driver unit in the block diagram of FIG. 1 according to Example 1 of the present invention.

In the circuit configuration illustrated in FIG. 4A, the switching circuit includes FETs 51 to 58 as switching elements.

As illustrated in FIG. 4A, when a phase-A pulse becomes high, the FETs 51 and 54 are turned on, and a current flows from a phase A toward a phase/A.

On the contrary, when a phase-/A pulse becomes high, the FETs 53 and 52 are turned on, and a current flows from the phase/A toward the phase A. The same is applied to a phase B so that the FETs 55 to 58 are turned on according to the supplied pulse signals, to thereby apply a voltage to the vibrator.

A and /A as well as B and /B are pulse signals shifted in phase by 180° and equal in pulse width to each other.

Impedance elements 41 and 42 conduct impedance matching with the motor. In this example, the impedance elements 41 and 42 are inductance elements. Although not illustrated, a capacitive element may be disposed in parallel to the vibrator in order to match the impedances.

In this way, the impedance elements 41 and 42 are added at the positions so that the motor can be driven with a lower voltage and high efficiency.

The peripheral circuit configuration of the current detector circuit 37 used in the method of controlling the vibration motor according to this example is described with reference to FIG. 4B.

Figure 4B:
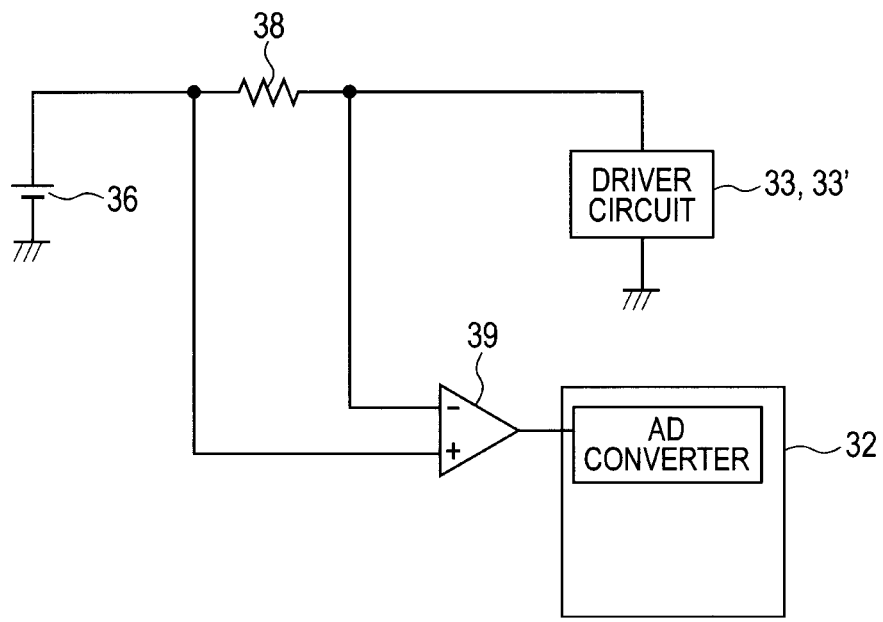
FIG. 4B is a diagram illustrating a peripheral circuit configuration of a current detector circuit of a circuit block in the block diagram of FIG. 1.

Referring to FIG. 4B, a current detection resistor 38 and a differential amplifier 39 are disposed. The current detector circuit 37 is disposed between the power supply 36 and the motor driver (amplifier circuits 33 and 33').

More specifically, voltages at terminals of the current detection resistor 38 are differentially amplified by the differential amplifier 39, and the resultant voltage is converted into digital data by an AD converter disposed in the microcomputer 32, and taken in the microcomputer 32 as a current detection result.

Figure 5A:
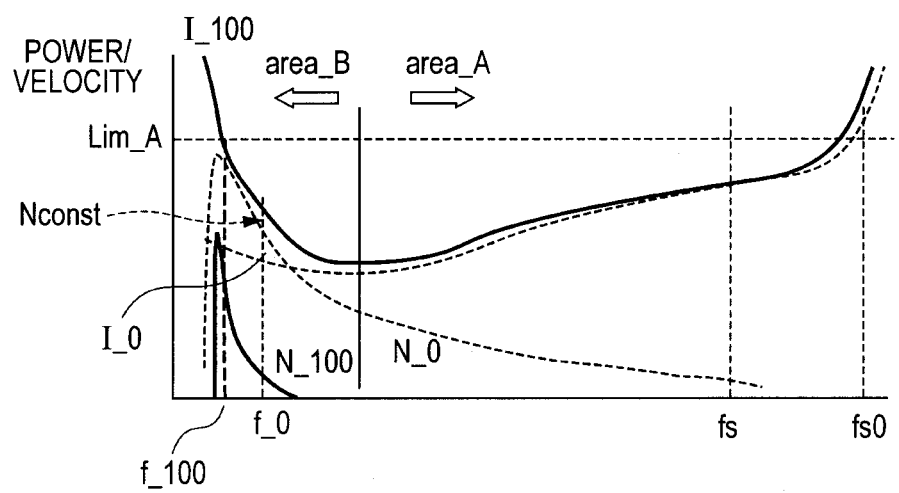
FIG. 5A is a graph illustrating a relationship among a frequency, a velocity, and a current for describing a control algorithm in the vibration motor control method according to Example 1 of the present invention.

FIG. 5A is a graph illustrating a relationship among a frequency, a velocity, and a current for describing a control algorithm according to this example.

In the characteristic graph, N_0 is a motor rotation frequency when a load torque is 0, and I_0 is a current characteristic at that time. A current is a current value detected by the current detector circuit 37, which is transmitted to the microcomputer 32.

N_100 is a motor rotation frequency when a load is 100 gfcm, and I_100 is an electric power characteristic at that time.

As is understood from FIG. 5A, a current does not exceed a limit value LimA in an overall frequency domain when the load torque is 0.

The method of controlling the vibration motor according to this example is described with reference to a flowchart of FIG. 5B.

First, the motor is turned on (F-11).

In this situation, when the motor starts, the microcomputer 32 sets a frequency fs as a drive frequency of sufficiently low velocity as illustrated in FIG. 5A, and turns on drive (F-12).

Then, it is determined whether a detected velocity at the frequency fs is higher or lower than a target velocity Nconst (F-13).

Then, if a detected current is lower than LimA (limit value), the drive frequency is decreased by X1 Hz (F-14, F-17).

The amount of the frequency variation X1 Hz is designed so as to obtain a given velocity change.

On the other hand, if the detected velocity is lower than the target velocity, and the detected current exceeds LimA (given limit value), in a flow of F-15, it is determined, by a determination unit in the control unit configured by the above-mentioned microcomputer 32, in which domain the frequency is.

The determination unit is so configured as to determine the frequency domain of the drive signal based on the current change caused by decreasing the frequency when the detected velocity is lower than the target velocity and when the detected current exceeds LimA.

In this situation, the frequency domain in which the detected current decreases by decreasing the frequency when the current value of the detected current exceeds LimA is set to an area area_A (first frequency domain), and the frequency domain in which the detected current increases is set to an area area_B (second frequency domain).

Those frequency domains are determined depending on whether the current decreases or increases when the frequency is decreased, by calculating, in advance, the current change obtained by decreasing the frequency when the detected velocity is lower than the target velocity and the detected current exceeds the limit value.

The current change is determined as the area area_A when the current change ratio is lower than 0, and determined as the area area_B when the current change ratio is larger than 0.

If the current change is in the area area_A, the current does not increase even if the frequency is decreased. Therefore, after the pulse width is decreased by the amount by which the detected current exceeds LimA so that the current value falls within LimA, the frequency is decreased in the range not exceeding LimA so that the velocity can increase.

Further, if the current change is in the area area_B, the drive frequency is fixed to the frequency at that time, to thereby prevent an increase in the current by decreasing the frequency.

Further, if the current value of the detected current still exceeds LimA in that state, the pulse width is decreased to prevent the current from increasing (F-18). Further, it is determined whether the current still exceeds LimA in that state (F-18a), and if the current exceeds LimA, the pulse width is narrowed to prevent the current from increasing (F-18b).

The detected velocity is compared with a target velocity Nconst+α which is an upper limit of a set range of the target velocity Nconst (F-19).

When the detected velocity is not smaller than the target velocity Nconst+α, since the velocity is too high, the frequency is returned to the higher side by X2 Hz to suppress the velocity (F-20).

When the detected velocity is smaller than the target velocity Nconst+α, it is determined whether the operation enters stop operation when arriving at a target position without any change (F-21).

When the stop operation is conducted, the motor is turned off to stop (F-22). On the other hand, when driving is continued, processing is returned to the point after the flow of F-12, and the above-mentioned velocity control operation is repeated.

The drive frequency continues to be decreased until the detected velocity arrives at the target velocity Nconst while repeating the velocity control operation.

Then, when the detected velocity exceeds the target velocity Nconst, the drive frequency is returned to a higher frequency, and the frequency is controlled to fall within a given velocity range.

Then, referring to FIG. 5A, a change in the operation according to the load state is described.

When the load torque is 0, the current value does not exceed LimA, and hence the motor is driven in a state in which the motor velocity is controlled to fall within the target velocity range under the above-mentioned velocity control.

When this control is described with reference to the above-mentioned algorithm, it is determined whether the detected velocity is higher or lower than the target velocity Nconst in the frequency fs (F-13).

When it is determined that the detected velocity is lower, the current at that time is also lower than LimA, and hence the drive frequency is decreased (F-14, F-17).

On the other hand, when it is determined that the detected velocity is higher, the detected velocity is compared with the target velocity Nconst+α that is the upper limit of the set range of the target velocity Nconst (F-19).

The detected velocity is smaller than the target velocity Nconst+α0 until the detected velocity arrives at the target velocity Nconst, and hence it is determined whether to stop the motor, or not (F-21).

The driving state continues, and hence the processing is returned to the point after the flow of F-12 to continue the frequency sweeping (frequency decreasing) operation.

The current does not exceed LimA during the operation, and hence the operation is finally conducted within a range of the target velocity, with the result that the operation is conducted until arriving at a stop position at the target velocity.

Then, when the load torque becomes, for example, 100 gfcm, the frequency is set to the same frequency fs as that when the load torque is 0, and the detected velocity is controlled with respect to the target velocity Nconst so that the frequency becomes lower (F-14, F-17).

The current value is also detected during the velocity control operation, and it is determined whether the current value is higher or lower than LimA.

When the frequency is sufficiently high, the detected velocity is lower than the target velocity Nconst and the current is also lower than LimA, and hence the drive frequency continues to be decreased.

As is understood from FIG. 5A, the current value exceeds LimA before the detected velocity arrives at the target velocity Nconst when the load is 100 gfcm.

The frequency is decreased when the current exceeds LimA, whereby it is determined whether the domain is the area area_B where the detected current increases, or the area area_A where the detected current decreases (F-15).

In FIG. 5A, the domain is in the area area_B, and hence the operation is conducted so that the frequency is not decreased lower than the frequency at which the current exceeds LimA.

Further, when the current exceeds LimA even after the frequency is so fixed as not to be decreased, the operation is conducted so that the pulse width of the drive voltage is decreased to decrease the current (F-18).

Then, when the start frequency is fs0 as illustrated in FIG. 5A, and the load is 100 gfcm, after the frequency is set to fs0 and it is determined whether the detected velocity is higher than the target velocity Nconst, or not, the current is detected (F-13, F-14).

The current exceeds LimA when the start frequency is fs0. Therefore, the frequency when the current exceeds LimA is decreased, and it is determined whether the domain is in the area area_B where the detected current increases, or in the area area A where the detected current decreases (F-15).

Because the frequency fs0 is in the area_A, after the pulse width is decreased so that the current does not exceed LimA, the drive frequency is decreased (F-16).

Thereafter, the start frequency conducts the same behavior as that in the case of fs.

In this example, the control of the frequency is different depending on in which area the frequency is when the current exceeds LimA.

That is, the frequency is decreased when the current exceeds LimA, whereby the control of the frequency is made different depending on whether the domain is in the area area_B where the detected current increases or in the area area_A where the detected current decreases, and the control is conducted.

Figure 5B:
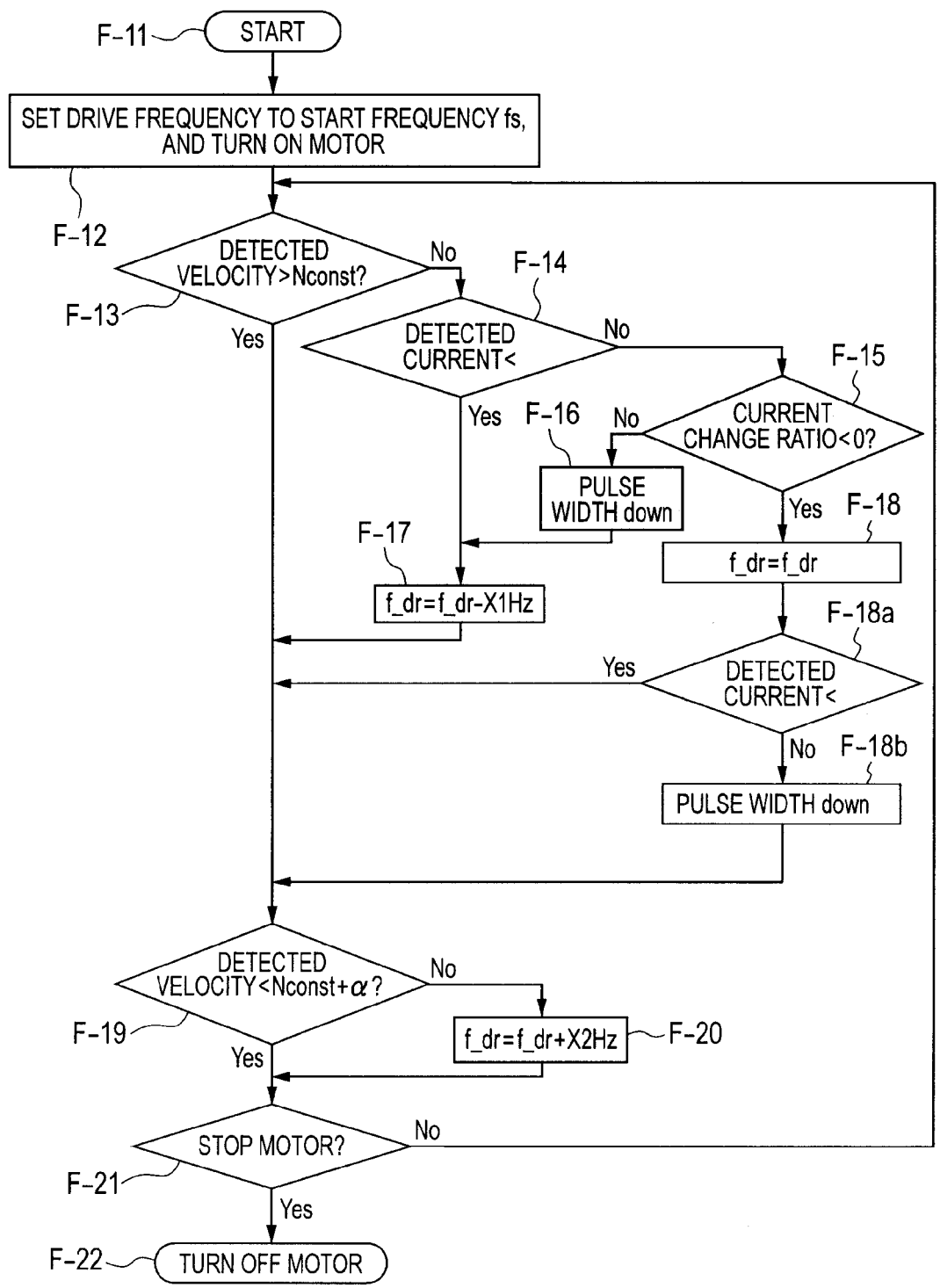
FIG. 5B is a flowchart illustrating the algorithm.

As illustrated in FIG. 5A and the flow of FIG. 5B, if the flow of F-18 is not used, and the drive frequency is set to be lower because the velocity does not arrive at Nconst, the current value exceeds LimA, and a drop of the battery voltage is induced. As a result, when the device configured together with another actuator and a display device is used with the battery as a power supply, the operation of another actuator and the display device is adversely affected.

For that reason, this example adopts a configuration in which, as illustrated in FIG. 5A, the frequency domain when the current value exceeds LimA value is determined, and in which the frequency is controlled so that the maximum output characteristic is exercised while the current value does not exceed LimA.

With the above-mentioned configuration, although the velocity becomes lower than Nconst, the current is prevented from exceeding LimA, to thereby prevent the operation of another actuator and the display device from failing.

Further, in this example, when the current value exceeds the set value, the pulse width is changed by the switching unit to control the current value.

Example 2

Figure 6A:
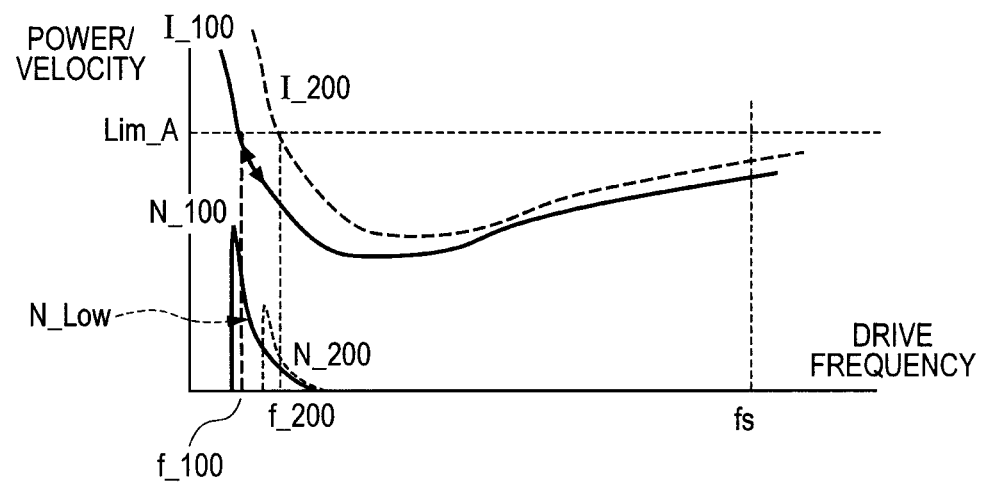
FIG. 6A is a graph illustrating a relationship among a frequency, a velocity, and a current for describing a control algorithm in a vibration motor control method according to Example 2 of the present invention.
Figure 6B:
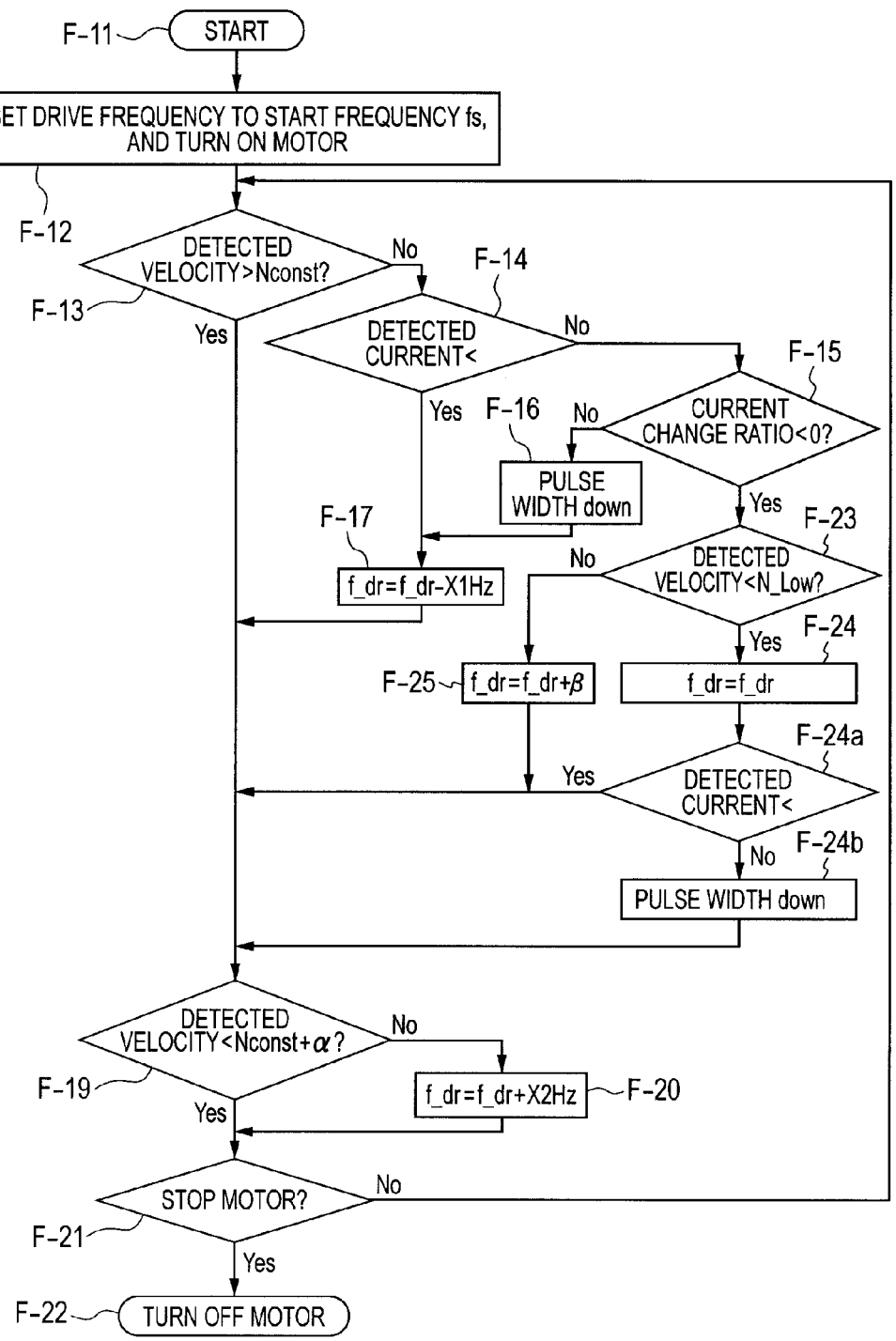
FIG. 6B is a flowchart illustrating the algorithm.

Referring to FIGS. 6A and 6B, a control algorithm in a method of controlling a vibration motor according to Example 2 different from Example 1 is described.

FIG. 5A of Example 1 illustrates the states in which the load is 0 and the load is 100 gfcm. On the other hand, in this example, FIG. 6A illustrates the states in which the load is larger, that is, 100 gfcm and 200 gfcm.

In this example, the algorithm when the current is detected and exceeds the limit value is different from that in Example 1.

The operation of the control circuit for the vibration motor according to this example is described with reference to a flowchart of FIG. 6B.

Referring to FIG. 6B, the same operation as that of Example 1 is conducted up to the flow of F-14. In the flow of F-14, when the detected current exceeds LimA, the current change ratio is smaller than 0, and the domain is determined as the area area_B, it is determined by the determination unit whether the detected velocity is higher or lower than a predetermined velocity N_Low (F-23).

If the velocity is lower than the predetermined velocity N_Low, it is understood that the operating range in which the operation can be conducted with a limited electric power or lower is narrow as illustrated by N_200 in FIG. 6A.

In this case, the frequency is fixed, and if the detected current still exceeds LimA, the pulse width is decreased, and the control is conducted so that the detected current does not exceed LimA (F-24).

On the other hand, if the detected velocity is higher than the predetermined velocity N_Low, it is understood that there is still an operable domain at the higher frequency side as illustrated by N_100 in FIG. 6A.

In this case, the drive frequency is increased by a given value (β) to decrease the velocity, and the control is conducted so that the detected current does not exceed LimA (F-25).

With the above-mentioned configuration, driving can be conducted with the use of a normal frequency excellent in efficiency without current exceeding the limit value.

If the operation is conducted while the above-mentioned frequency is not shifted to the higher side of the drive frequency by β, the driven frequency is close to the frequency at which the current exceeds the given value, and hence the operation of narrowing the pulse width as in a flow of F-24 is frequently required.

Then, the velocity characteristic is sequentially changed, with the result that the operation becomes unstable, the velocity may become uneven, and the motor may stop in some cases.

As in a flow of F-25, the frequency is set to the drive frequency that is hardly subjected to the above-mentioned characteristic change, whereby driving can be conducted so that the maximum output is performed in a state in which the motor characteristic is stable.

Example 3

Figure 7A:
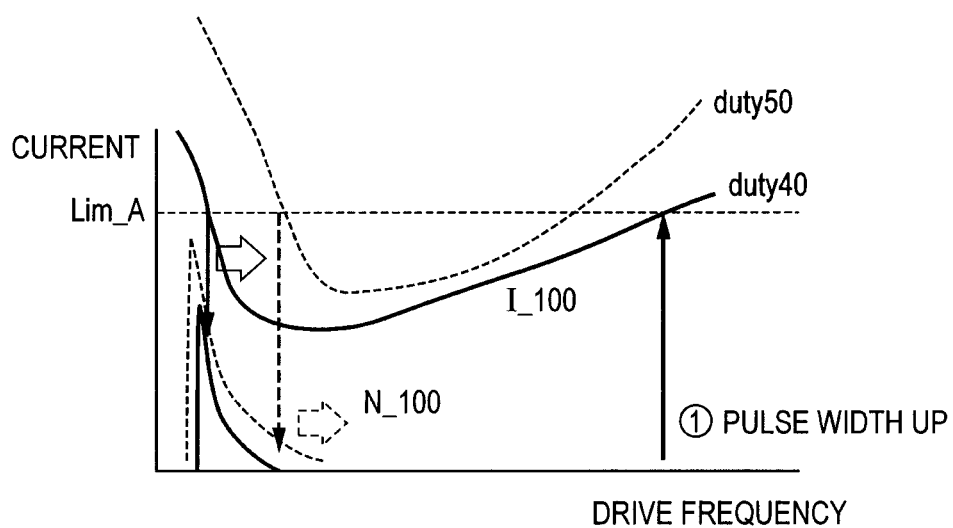
FIG. 7A is a graph illustrating a relationship among a frequency, a velocity, and a current for describing a control algorithm in a vibration motor control method according to Example 3 of the present invention.
Figure 7B:
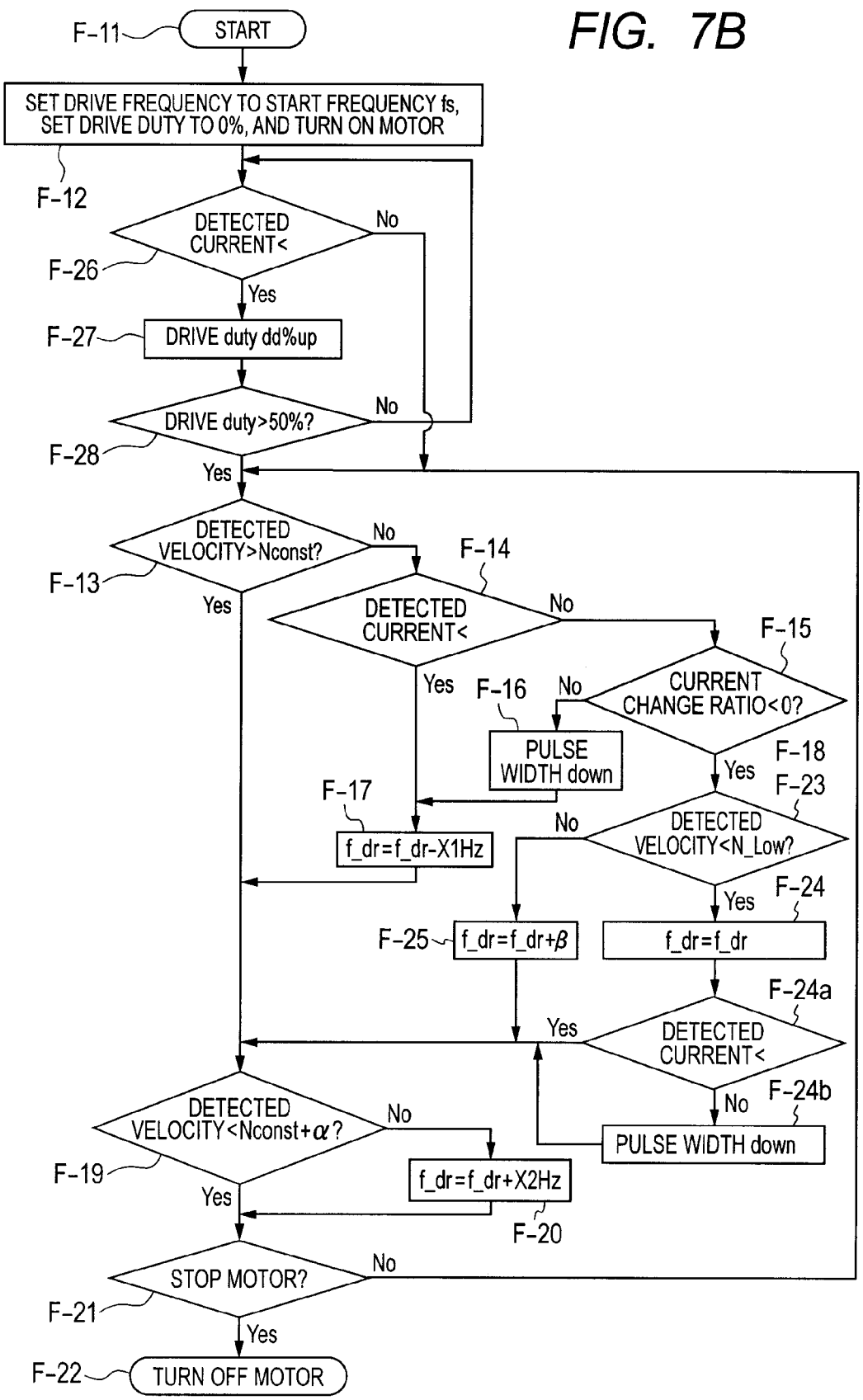
FIG. 7B is a flowchart illustrating the algorithm.
Figure 8:
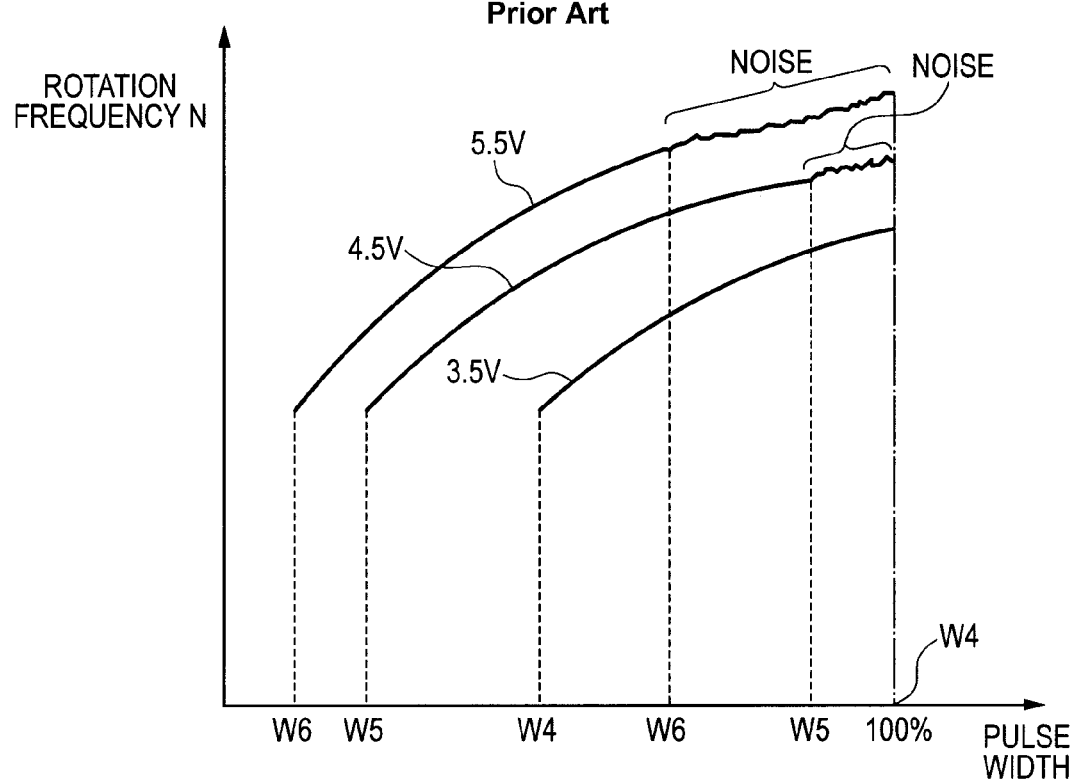
FIG. 8 is a graph illustrating a relationship between a pulse width and a supply voltage in the related art.

Referring to FIGS. 7A and 7B, a control algorithm in a method of controlling a vibration motor according to Example 3 different from Example 1 and Example 2 is described.

FIG. 7A illustrates states in which the drive voltage pulse width when the load is 100 under a given environmental condition is 50% in duty and 40% in duty.

In the normal driving, the duty is 50% so that the maximum output is performed at a low voltage.

In the following description, the pulse width duty 50% is denoted by "pulse width 50%".

Under the environment illustrated in FIG. 7A, as is understood from the figure, when the driving is conducted with the pulse width 50%, an area where the current exceeds the limit current LimA starts from the start frequency fs.

When the algorithm of Example 1 or Example 2 is used, the operation is enabled by narrowing the pulse width in the vicinity of the start frequency. However, the current exceeds LimA when the voltage is first turned on.

Then, the current continues to exceed the limit current while the pulse width is being narrowed until the current falls to a value not exceeding LimA, and there is a possibility that another actuator and a display device are adversely affected according to the circumstance.

FIG. 7B is an algorithm of Example 3, and the driving method at the time of startup is different from that of Example 1 and Example 2.

Hereinafter, a method of controlling the vibration motor according to Example 3 is described with reference to FIGS. 7A and 7B.

First, the motor is turned on at the start frequency.

The pulse width starts from 0 in this example whereas a predetermined pulse width is given in the related art.

Then, the current at that time is detected, and it is determined whether the current exceeds the limit value LimA, or not (F-26).

Then, when the pulse width is 0, the current is 0, that is, the current does not exceed the limit value LimA, and therefore the pulse width is gradually increased from 0 (F-27).

Then, it is determined whether the result of increasing the pulse width exceeds 50%, or not (F-28). If the pulse width exceeds 50%, even if the pulse width is further increased, the output is not exercised. Therefore, the processing is shifted to the velocity control operation starting from the flow of F-13.

In FIG. 7A, the current does not arrive at the current limit value LimA while the pulse width is 40% or less, and hence the pulse width increasing operation is repeated.

Then, when the pulse width reaches 40%, the current exceeds the limit value, and the processing is shifted to the velocity control operation starting from the flow of F-13.

In the algorithm starting from the flow of F-13, while the velocity is controlled in the same manner as that of Example 1 and Example 2, when the current exceeds the current limit value LimA, the operation is conducted so as not to further decrease the frequency.

As is understood from FIG. 7A, when the pulse width is 50%, there is a frequency domain in which the current falls to or below the current limit LimA. However, the available domain is considerably narrowed.

Even if the start frequency can be set to the narrow available domain, the frequency in which the current exceeds the current limit LimA when the frequency is decreased is not in the frequency domain where the high velocity is exercised. Therefore, the motor is set to a state in which the motor hardly operates.

However, when the pulse width is optimized to 40% at the start frequency and the velocity is controlled in that state as in this example, even if the frequency is fixed at the frequency where the current exceeds the current limit LimA at a lower side of the frequency, the motor can be driven in a state in which a sufficient torque is obtained.

The vibration motor is being developed for use in portable devices such as a camera and a digital camcorder in which the battery is used as the power supply.

In such a vibration motor, a drive control method that enables the maximum performance without the current exceeding the current limit is proposed so that the motor can be developed to a wider range of products.

As described above, according to the configurations of the respective examples of the present invention, the unit for controlling the frequency and the pulse width so that the current does not exceed the target current is provided as a countermeasure against an increase in the current due to a change in the temperature and a change in the drive load.

For that reason, according to the method of controlling the vibration motor, it is possible to avoid the situation in which that the current exceeds the current limit to drop the battery voltage, and another actuator and the display device become disabled under all of the drive conditions.

Example 4

Figure 9:
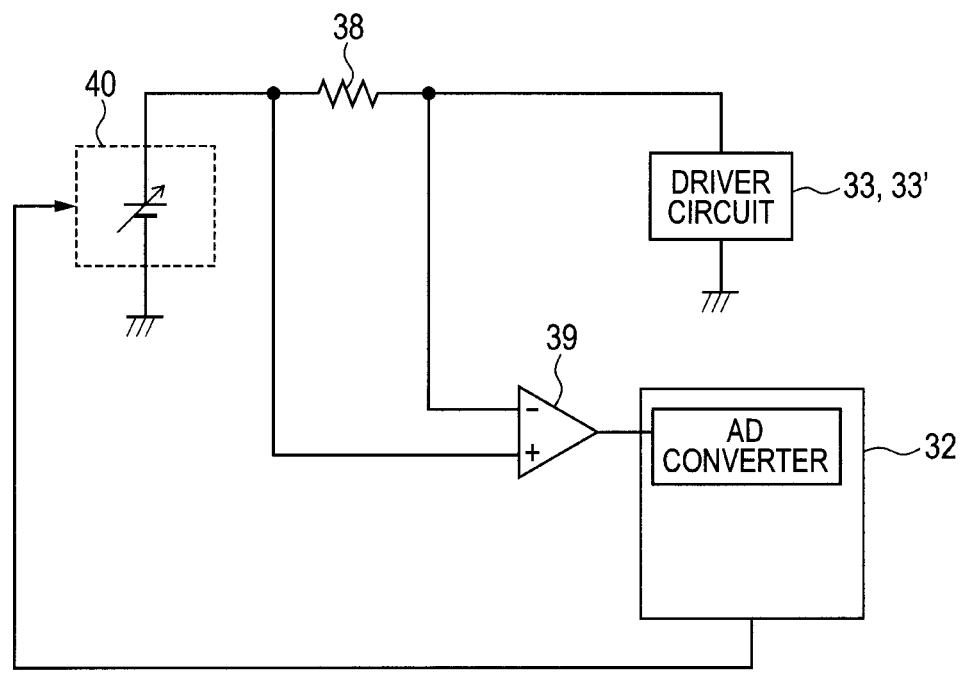
FIG. 9 is a diagram illustrating a circuit configuration used for performing control according to Example 4.

FIG. 9 is a diagram illustrating a circuit configuration used for performing control according to Example 4.

In Example 1, the pulse width of the switching voltage is changed to control the motor current (electric power). On the other hand, in this example, a voltage value of the switching voltage is changed to control the electric power supplied to the motor.

Referring to FIG. 9, a variable voltage source 40 changes the voltage supplied to the switching units 33 and 33' according to a command value from the microcomputer 32.

In this example, as in the other examples, a motor current value is obtained by converting a detected voltage into the motor current value by the AD converter, which is a current value acquisition unit. Next, based on the converted motor current value, electric power consumption is calculated from the product of the converted motor current value and a voltage command value supplied to the switching units. However, the method of obtaining the current value is not limited thereto, and the current value may be obtained by, for example, an ammeter. In the present invention, the current value or the voltage value may be obtained directly from a detection unit provided in a circuit or the like, or may be calculated (obtained indirectly) by detecting another signal correlated with the current value or the voltage value and subjecting the signal to an operation or the like. Any method may be employed as long as the current value or the electric power value is eventually obtained. In the present invention, such unit that is capable of eventually obtaining the current value or the electric power value is referred to as a current value acquisition unit (current (value) detection unit) or an electric power value acquisition unit (electric power (value) detection unit).

Figure 10A:
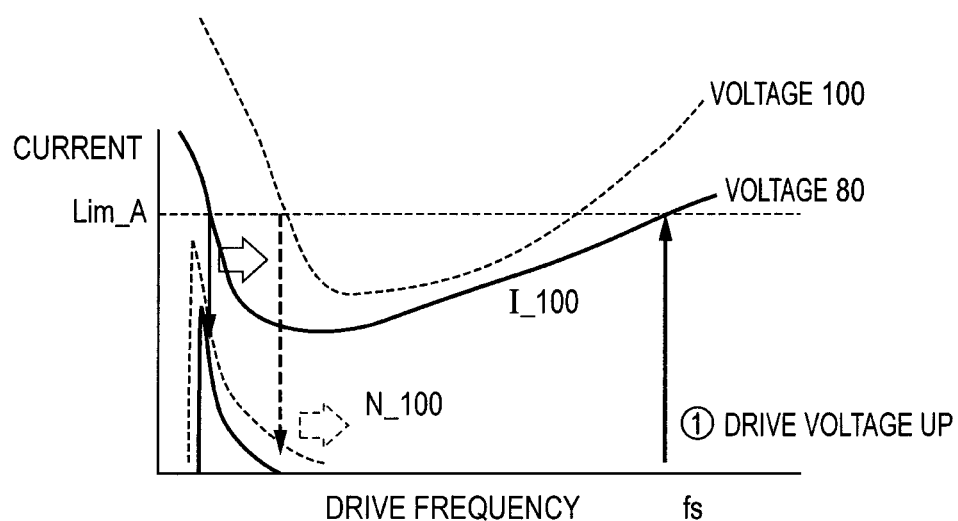
FIG. 10A is a graph illustrating a relationship among a frequency, a velocity, and a current for describing a control algorithm in a vibration motor control method according to Example 4 of the present invention.

FIG. 10A is a graph illustrating a relationship among a frequency, a velocity, and a current for describing a control algorithm according to Example 4 of the present invention.

FIG. 10A illustrates states in which a pulse voltage when the load is 100 under a given environmental condition is 100 and 80. In the normal driving, the driving is conducted at high voltage, at which vibration occurs easily.

Under the environment illustrated in FIG. 10A, as is understood from the figure, when the driving is conducted with the pulse voltage of 100, an area where the current exceeds the limit current LimA (limit value), which is a predetermined value, starts from the start frequency fs, and the current exceeds LimA when the voltage is first turned on.

Then, as in the case of Example 3, the current continues to exceed the limit current while the pulse voltage is being decreased until the current falls to a value not exceeding LimA, and there is a possibility that another actuator and a display device are adversely affected according to the circumstance.

Figure 10B:
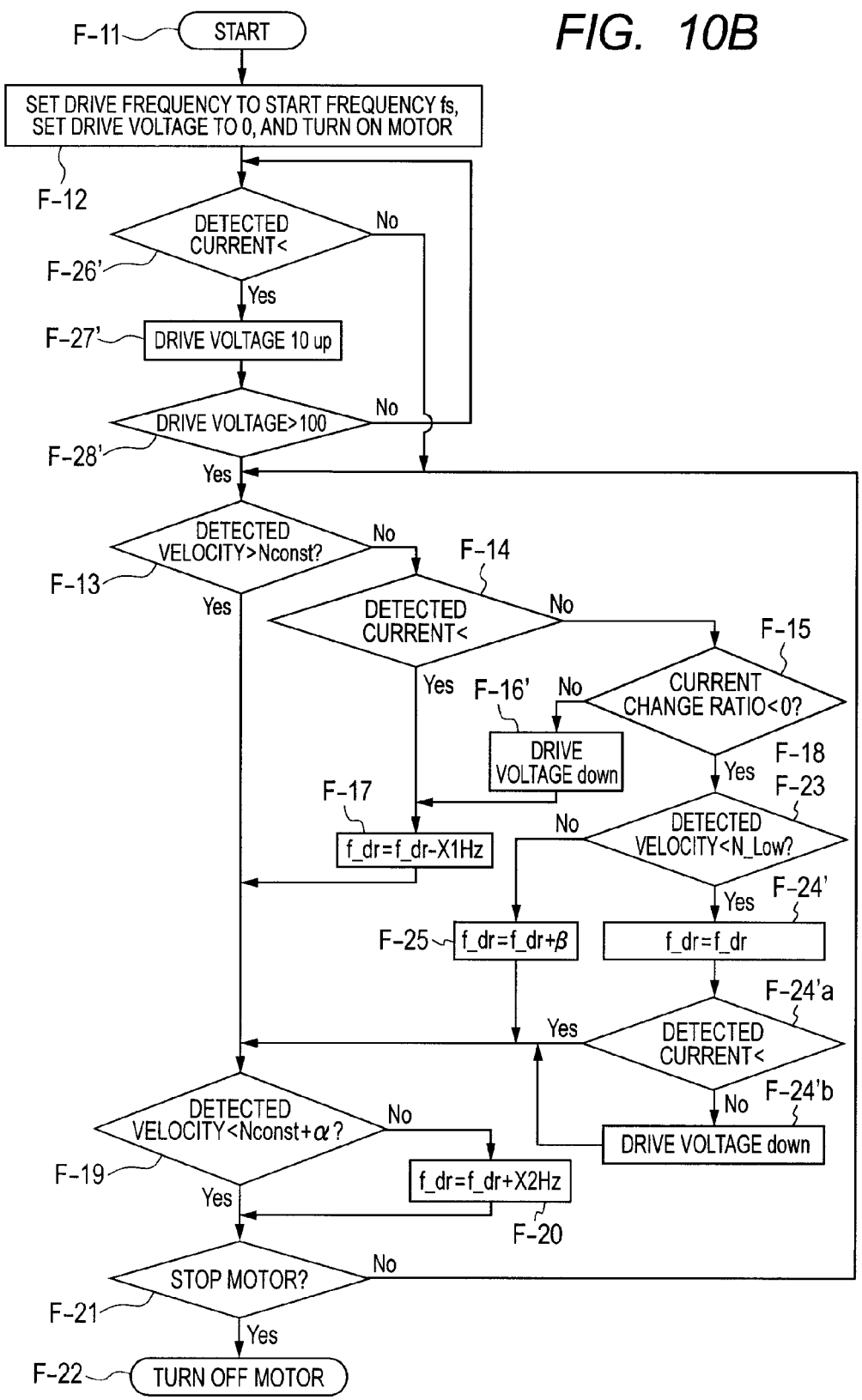
FIG. 10B is a flowchart illustrating the algorithm.

FIG. 10B is an algorithm of Example 4. In this example, the parameter for controlling the magnitude of the electric power is the pulse voltage of the switching unit.

First, the motor is turned on at the start frequency. The pulse voltage starts from 0 in this example.

Then, a motor current value is obtained by converting the detected voltage into the motor current value by the AD converter at that time. Next, based on the converted motor current value, electric power consumption is calculated from the product of the converted motor current value and a voltage command value supplied to the switching units. The thus obtained electric power consumption is used to detect the current, and it is determined whether the current exceeds the limit value LimA, or not (F-26').

When the supply voltage is 0, the electric power is 0, that is, the current does not exceed the limit value LimA, and hence the operation is conducted so that the pulse voltage is increased by 10 (F-27').

Then, it is determined whether the result of increasing the pulse voltage exceeds 100, or not (F-28').

In FIG. 10A, the current does not arrive at the electric power limit value LimA while the drive voltage is 80 or less, and hence the pulse voltage increasing operation is repeated.

Then, when the pulse voltage reaches 80, the electric power exceeds the limit value, and the processing is set to be shifted to the velocity control operation starting from F-13.

In the algorithm starting from (F-13), while the velocity is controlled in the same manner as that of Examples 1 and 2, when the electric power exceeds the electric power limit value LimA, the operation can be conducted so as not to further decrease the frequency, and the pulse voltage can be controlled to drive the motor within the current limit value LimA.

As is understood from FIG. 10A, when the drive voltage is 100, there is a frequency domain in which the current falls to or below the electric power limit LimA. However, the available domain is considerably narrowed.

Even if the start frequency can be set to the narrow available domain, the frequency in which the current exceeds the electric power limit LimA when the frequency is decreased is not in the frequency domain where the high velocity is exercised. Therefore, the motor is set to a state in which the motor hardly operates.

However, when the pulse voltage is optimized to 80 at the start frequency and the velocity is controlled in that state as in this example, even if the frequency is fixed at the frequency where the current exceeds the electric power limit LimA at a lower side of the frequency, the motor can be driven in a state in which a sufficient torque is obtained.

By controlling the pulse voltage so as not to exceed the given electric power while monitoring the electric power as in the above-mentioned example, the maximum torque can be generated without exceeding the target power consumption.

The vibration motor is being developed for use in portable devices such as a camera and a digital camcorder in which the battery is used as the power supply.

In such a vibration motor, a drive control method that enables the maximum performance without the current exceeding the current limit is proposed so that the motor can be developed to a wider range of products. In other words, the frequency of the drive signal and the pulse voltage can be controlled so as to exercise the given output characteristic including the maximum torque and the maximum output within the limit value.

As described above, according to the configurations of the respective examples of the present invention, the unit for controlling the frequency and the pulse width or the magnitude of the pulse voltage so that the current does not exceed the target electric power is provided as a countermeasure against an increase in the electric power due to a change in the temperature and a change in the drive load.

For that reason, according to the method of controlling the vibration motor, it is possible to avoid the situation in which the current exceeds the current limit to drop the battery voltage, and another actuator and the display device become disabled under all of the drive conditions.

Further, in the above-mentioned examples, there has been described a method of conducting control so that the obtained electric power value does not exceed the limit value. However, if it is known in advance that the variation range of the pulse voltage value is small, or if the control accuracy is allowed to be somewhat low, it is not always necessary to obtain the electric power value. Then, it is also possible to conduct control so that the obtained current value does not exceed the limit value. With the above-mentioned configuration, it is possible to omit the arithmetic processing circuit for obtaining the electric power value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-124793, filed May 31, 2010, and 2011-091077, filed Apr. 15, 2011, which are hereby incorporated by reference herein in their entirety.

What is claimed is:

1. A method of controlling a vibration motor comprising an electromechanical energy conversion element joined to an elastic body, the method comprising:
    generating a drive signal in accordance with a signal from a control unit;
    switching, using a switching unit, a voltage from a power supply in accordance with the drive signal;
    detecting a current flowing to the switching unit;
    detecting at least one of a position and a velocity of an object in contact with the elastic body of the vibration motor;
    determining whether a frequency of the drive signal is in a first frequency domain or in a second frequency domain; and
    performing at least one of narrowing of a pulse width of the drive signal and decreasing the frequency of the drive signal when the frequency of the drive signal is in the first frequency domain; and
    performing narrowing of the pulse width of the drive signal when the frequency of the drive signal is in the second frequency domain,
    wherein, in the first frequency domain, the current decreases when the frequency of the drive signal decreases, and
    wherein, in the second frequency domain, the current increases when the frequency of the drive signal decreases.

2. The method of controlling a vibration motor according to claim 1,
    wherein the control unit comprises a determination unit that determines in which domain the frequency of the drive signal exists, based on a change in the current caused by decreasing the frequency when the velocity detected in the detection step is lower than a target velocity and when the current detected in the current detection step exceeds a given limit value,
    wherein the determination unit is configured so as to determine the domain of the frequency of the drive signal to be one of the first frequency domain in which the detected current decreases when the frequency is decreased and the second frequency domain in which the detected current increases when the frequency is decreased,
    wherein, when the frequency of the drive signal is determined to be in the first frequency domain, the frequency of the drive signal is decreased after the pulse width is narrowed, and
    wherein, when the frequency of the drive signal is determined to be in the second frequency domain, the pulse width is narrowed.

3. The method of controlling a vibration motor according to claim 1, further comprising determining whether the detected velocity of the object when the frequency of the drive signal is in the second frequency domain is higher or lower than a predetermined velocity,
    wherein, when the detected velocity is lower than the predetermined velocity, the pulse width is narrowed, and
    wherein, when the detected velocity is higher than the predetermined velocity, the frequency of the drive signal is increased.

4. The method of controlling a vibration motor according to claim 1, further comprising gradually increasing the pulse width of the drive signal from 0, and stopping an operation of increasing the pulse width when the detected current value exceeds a given value.

5. A method of controlling a vibration motor comprising an electromechanical energy conversion element joined to an elastic body, the method comprising:
    generating a drive signal in accordance with a signal from a control unit;
    switching, using a switching unit, a voltage from a power supply in accordance with the drive signal;
    acquiring an electric power between the power supply and the switching unit;
    detecting at least one of a position and a velocity of an object in contact with the elastic body of the vibration motor;
    determining whether a frequency of the drive signal is in a first frequency domain or in a second frequency domain; and
    performing at least one of narrowing of a pulse width of the drive signal and decreasing a frequency of the drive signal when the frequency of the drive signal is in the first frequency domain; and
    performing narrowing of the pulse width of the drive signal when the frequency of the drive signal is in the second frequency domain,
    wherein, in the first frequency domain, the electric power decreases when the frequency of the drive signal decreases, and
    wherein, in the second frequency domain, the electric power increases when the frequency of the drive signal decreases.

6. The method of controlling a vibration motor according to claim 5,
wherein the control unit comprises a determination unit that determines in which domain the frequency of the drive signal exists, based on a change in the current caused by decreasing the frequency when the velocity detected by the detection unit is lower than a target velocity and when the electric power detected in the electric power acquiring step exceeds a given limit value,
wherein the determination unit is configured so as to determine the domain of the frequency of the drive signal to be one of the first frequency domain in which the acquired electric power decreases when the frequency is decreased and the second frequency domain in which the acquired electric power increases when the frequency is decreased,
wherein, when the frequency of the drive signal is determined to be in the first frequency domain, the frequency of the drive signal is decreased after the pulse width is narrowed, and
wherein, when the frequency of the drive signal is determined to be in the second frequency domain, the pulse width is narrowed.

7. The method of controlling a vibration motor according to claim 5, further comprising determining whether the detected velocity of the object when the frequency of the drive signal is in the second frequency domain is higher or lower than the predetermined velocity,
wherein, when the detected velocity is lower than a predetermined velocity, the pulse width is narrowed, and
wherein, when the detected velocity is higher than the predetermined velocity, the frequency of the drive signal is increased.

8. The method of controlling a vibration motor according to claim 5, further comprising gradually increasing the pulse width of the drive signal from 0, and stopping an operation of increasing the pulse width when the acquired electric power exceeds a given value.

9. A driver for a vibration motor comprising an electromechanical energy conversion element and an elastic body joined with the electromechanical energy conversion element, the driver comprising:
a drive signal generation unit configured to generate a drive signal;
a switching unit configured to switch a voltage from a power supply;
a current detection unit between the power supply and the switching unit;
a detection unit configured to detect at least one of a position and a velocity of an object which is in contact with the elastic body; and
a control unit comprising a determination unit configured to determine whether a frequency of the drive signal is in a first frequency domain or in a second frequency domain,
wherein the control unit is configured to output a first signal when the frequency of the drive signal is in the first frequency domain, and to output a second signal when the frequency of the drive signal is in the second frequency domain,
wherein, in the first frequency domain, the current decreases when the frequency of the drive signal decreases,
wherein, in the second frequency domain, the current increases when the frequency of the drive signal decreases,
wherein the first signal includes at least one of information to narrow a pulse width of the drive signal and information to decrease the frequency of the drive signal, and
wherein the second signal includes information to narrow the pulse width of the drive signal.

10. The driver for a vibration motor according to claim 9,
wherein the control unit is configured to output, as the first signal, a signal to narrow the pulse width of the drive signal and thereafter decrease the frequency of the drive signal when the frequency of the drive signal is determined by the determination unit to be in the first frequency domain, and
wherein the control unit is configured to output, as the second signal, a signal to narrow the pulse width of the drive signal when the frequency of the drive signal is determined by the determination unit to be in the second frequency domain.

11. The driver for a vibration motor according to claim 9,
wherein the determination unit is configured to determine whether the detected velocity of the object when the frequency of the drive signal is in the second frequency domain is higher or lower than a predetermined velocity,
wherein the control unit is configured so as to output a signal to narrow the pulse width when the detected velocity is lower than the predetermined velocity, and
wherein the control unit is configured so as to output a signal to increase the frequency of the drive signal when the detected velocity is higher than the predetermined velocity.

12. The driver for a vibration motor according to claim 9, wherein the control unit is configured so as to output a signal to gradually increase the pulse width from 0, and stop an operation of increasing the pulse width when a current value obtained from the current detection unit exceeds a given value.

13. The driver for a vibration motor according to claim 9, wherein the control unit is configured to output the first signal or the second signal when a current value obtained from the current detection unit exceeds a predetermined current.

14. The driver for a vibration motor according to claim 9, wherein the elastic body comprises a contact portion, and
wherein an elliptic motion is generated on the contact portion by application of the drive signal.

15. A driver for a vibration motor comprising an electromechanical energy conversion element and an elastic body joined with the electromechanical energy conversion element, the driver comprising:
a drive signal generation unit configured to generate a drive signal;
a switching unit configured to switch a voltage from the power supply;
an electric power acquisition unit provided between the power supply and the switching unit;
a detection unit configured to detect at least one of a position and a velocity of an object which is in contact with the elastic body; and
a control unit comprising a determination unit configured to determine whether a frequency of the drive signal is in a first frequency domain or in a second frequency domain,
wherein the control unit is configured to output a first signal when the frequency of the drive signal is in the first frequency domain, and to output a second signal when the frequency of the drive signal is in the second frequency domain, wherein, in the first frequency domain, the current decreases when the frequency of the drive signal decreases, wherein, in the second frequency domain, the current increases when the frequency of the drive signal decreases, wherein the first signal includes at least one of information to narrow a pulse width of the drive signal and information to decrease the frequency of the drive signal, and wherein the second signal includes information to narrow the pulse width of the drive signal.

16. The driver for a vibration motor according to claim 15, wherein the control unit is configured to output, as the first signal, a signal to narrow the pulse width of the drive signal and thereafter decrease the frequency of the drive signal when the frequency of the drive signal is determined by the determination unit to be in the first frequency domain, and wherein the control unit is configured to output, as the second signal, a signal to narrow the pulse width of the drive signal when the frequency of the drive signal is determined by the determination unit to be in the second frequency domain.

17. The driver for a vibration motor according to claim 15, wherein the determination unit is configured to determine whether the detected velocity of the object when the frequency of the drive signal is in the second frequency domain is higher or lower than a predetermined velocity, wherein the control unit is configured so as to output a signal to narrow the pulse width when the detected velocity is lower than the predetermined velocity, and wherein the control unit is configured so as to output a signal to increase the frequency of the drive signal when the detected velocity is higher than the predetermined velocity.

18. The driver for a vibration motor according to claim 15, wherein the control unit is configured so as to output a signal to gradually increase the pulse width from 0, and stop an operation of increasing the pulse width when an electric power value obtained from the electric power acquisition unit exceeds a given value.

19. The driver for a vibration motor according to claim 15, wherein the control unit is configured to output the first signal or the second signal when an electric power value obtained by the electric power acquisition unit exceeds a predetermined value.

20. The driver for a vibration motor according to claim 15, wherein the elastic body comprises a contact portion, and wherein an elliptic motion is generated on the contact portion by application of the drive signal.

* * * * *